US009633462B2

(12) United States Patent
Gross (10) Patent No.: US 9,633,462 B2
(45) Date of Patent: Apr. 25, 2017

(54) PROVIDING PRE-EDITS FOR PHOTOS (71) Applicant: Google Inc., Mountain View, CA (US)

(72) Inventor: Robert-Reinhold Gross, Schleswig-Holstein (DE)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/706,766

(22) Filed: May 7, 2015

(65) Prior Publication Data

US 2015/0325023 A1 Nov. 12, 2015

Related U.S. Application Data (60) Provisional application No. 61/991,064, filed on May 9, 2014.

(51) Int. Cl.
G06K 9/46 (2006.01)
G06T 11/60 (2006.01)
G06K 9/00 (2006.01)
G06T 3/40 (2006.01)
G06T 7/40 (2017.01)
G06T 5/00 (2006.01)
G06K 9/32 (2006.01)

(52) U.S. Cl.
CPC .......... *G06T 11/60* (2013.01); *G06K 9/00208* (2013.01); *G06K 9/00221* (2013.01); *G06K 9/00228* (2013.01); *G06K 9/3241* (2013.01); *G06T 3/40* (2013.01); *G06T 5/00* (2013.01); *G06T 7/408* (2013.01); *G06T 2207/10004* (2013.01); *G06T 2207/10024* (2013.01); *G06T 2207/20092* (2013.01); *G06T 2210/22* (2013.01)

(58) Field of Classification Search
CPC .. G06K 9/00; G06K 9/00208; G06K 9/00664; G06T 11/60; G06T 3/40
USPC ....................................................... 382/203
See application file for complete search history.

(56) References Cited

U.S. PATENT DOCUMENTS

| 6,434,271 | B1 | 8/2002 | Christian et al. |
| 8,265,410 | B1 | 9/2012 | Konoplev |
| 8,453,072 | B2 | 5/2013 | Breglio |
| 8,666,148 | B2 | 3/2014 | Paris et al. |
| 8,928,947 | B2 * | 1/2015 | Hooper ..................... G06T 5/20 358/3.27 |
| 2010/0259647 | A1 | 10/2010 | Gann |
| 2011/0249863 | A1 * | 10/2011 | Ohashi .................. G06T 7/0081 382/103 |

(Continued)

FOREIGN PATENT DOCUMENTS

EP 2685423 A2 1/2014

OTHER PUBLICATIONS

Joshi, Neel et al. "Personal Photo Enhancement Using Example Images." ACM Transactions on Graphics. vol. 29, No. 2. 15 pages. Mar. 2010.

(Continued)

*Primary Examiner* — Ruiping Li
(74) *Attorney, Agent, or Firm* — IP Spring (57) ABSTRACT Implementations generally relate to providing pre-edits to photos. In some implementations, a method includes detecting one or more objects in a photo. The method further includes classifying the one or more objects. The method further includes selecting one or more parameter values for one or more respective filters based on the classifying of the one or more objects.

20 Claims, 6 Drawing Sheets (56) References Cited

U.S. PATENT DOCUMENTS

2012/0075492 A1  3/2012  Nanu et al.

OTHER PUBLICATIONS

European Patent Office. International Search Report and Written Opinion for related International Patent Application No. PCT/US2015/029752. 12 pages. Aug. 7, 2015.
Winn, J. et al.; "Object Categorization by Learned Universal Visual Dictionary," Microsoft Research, Cambridge, UK—http://research.microsoft.com/vision/cambridge/recognition/; Jan. 1, 2005; pp. 1-8.

* cited by examiner

PROVIDING PRE-EDITS FOR PHOTOS

CROSS REFERENCE TO RELATED APPLICATIONS

This application is a non-provisional of and claims priority from U.S. Provisional Patent Application No. 61/991,064 entitled "PROVIDING PRE-EDITS FOR PHOTOS," filed May 9, 2014, which is hereby incorporated by reference as if set forth in full in this application for all purposes.

BACKGROUND

The popularity and convenience of digital cameras as well as the widespread use of Internet communications have caused user-produced images such as photographs to become ubiquitous. Image editing systems for various consumer electronic devices and personal computers enable a user to apply filters to their photos. A filter is an image processing unit containing different techniques for changing an image.

SUMMARY

Implementations generally relate to providing pre-edits to photos. In some implementations, a method includes detecting one or more objects in a photo. The method further includes classifying the one or more objects. The method further includes selecting one or more parameter values for one or more respective filters based on the classifying of the one or more objects.

With further regard to the method, in some implementations, the classifying includes recognizing at least one type of object for each detected object, and associating one or more predetermined categories to each detected object based on the at least one type of object recognized. In some implementations, the method further includes associating one or more predetermined categories to each detected object based on at least one type of object recognized, where the one or more predetermined categories include one or more of people, faces, indoor objects, and outdoor objects. In some implementations, the one or more filters include one or more of a tune image filter, a straighten filter, a crop filter, a details filter, and a black and white filter. In some implementations, at least one filter performs operations including determining a center point of an object based on recognition data, and adjusting the one or more parameter values for the one or more respective filters based on the center point. In some implementations, at least one filter performs operations including determining a color of a face based on recognition data, and adjusting at least one parameter value associated with a filter that adjusts an exposure of the face, where the adjusting of the one or more parameter values is based on at least the color of the face. In some implementations, at least one filter performs operations including identifying at least one outdoor object based on recognition data, and adjusting at least one parameter value associated with a filter that adjusts parameter values associated with outdoor objects based on one or more of brightness and orientation. In some implementations, the method further includes applying one or more of the filters to the photo. In some implementations, the method further includes selecting one or more parameter values for an entire photo based on one or more of types of objects in the photo. In some implementations, the method further includes selecting one or more parameter values for an entire photo based on one or more of a number of each type of object in the photo and a proportion of the photo taken up by each type of object.

In some implementations, a non-transitory computer-readable storage medium carries program instructions thereon, where the instructions when executed by one or more processors cause the one or more processors to perform operations including: detecting one or more objects in a photo; classifying the one or more objects; selecting one or more parameter values for one or more respective filters based on the classifying of the one or more objects; and adjusting the one or more of the parameter values based on the classifying of the one or more objects.

With further regard to the computer-readable storage medium, in some implementations, the instructions further cause the one or more processors to perform operations including recognizing at least one type of object for each detected object, and associating one or more predetermined categories to each detected object based on the at least one type of object recognized. In some implementations, the instructions further cause the one or more processors to perform operations including associating one or more predetermined categories to each detected object based on at least one type of object recognized, where the one or more predetermined categories include one or more of people, faces, indoor objects, and outdoor objects. In some implementations, the one or more filters include one or more of a tune image filter, a straighten filter, a crop filter, a details filter, and a black and white filter. In some implementations, the instructions further cause the one or more processors to perform operations including determining a center point of an object based on recognition data, and adjusting the one or more parameter values for the one or more respective filters based on the center point. In some implementations, the instructions further cause the one or more processors to perform operations including determining a color of a face based on recognition data, and adjusting at least one parameter value associated with a filter that adjusts an exposure of the face, where the adjusting of the one or more parameter values is based on at least the color of the face. In some implementations, the instructions further cause the one or more processors to perform operations including identifying at least one outdoor object based on recognition data, and adjusting at least one parameter value associated with a filter that adjusts parameter values associated with outdoor objects based on one or more of brightness and orientation.

In some implementations, a system includes one or more processors, and logic encoded in one or more tangible media for execution by the one or more processors. When executed, the logic is operable to perform operations including: detecting one or more objects in a photo; classifying the one or more objects; selecting one or more parameter values for one or more respective filters based on the classifying of the one or more objects; and adjusting the one or more of the parameter values based on the classifying of the one or more objects.

With further regard to the system, in some implementations, the logic when executed is further operable to perform operations including recognizing at least one type of object for each detected object, and associating one or more predetermined categories to each detected object based on the at least one type of object recognized. In some implementations, the logic when executed is further operable to perform operations including associating one or more predetermined categories to each detected object based on at least one type of object recognized, where the one or more predetermined categories include one or more of people, faces, indoor objects, and outdoor objects. In some implementations, the one or more filters include one or more of a tune image filter, a straighten filter, a crop filter, a details filter, and a black and white filter. In some implementations, the logic when executed is further operable to perform operations including determining a center point of an object based on recognition data, and adjusting the one or more parameter values for the one or more respective filters based on the center point. In some implementations, the logic when executed is further operable to perform operations including determining a color of a face based on recognition data, and adjusting at least one parameter value associated with a filter that adjusts an exposure of the face, where the adjusting of the one or more parameter values is based on at least the color of the face.

DETAILED DESCRIPTION

Implementations described herein provide pre-edits for photos. In various implementations, pre-edits are automatic adjustments to filter parameters that a system performs for the user. For example, in some implementations, a pre-edit may be an automatic filter application that shows a preview photo for user approval. A pre-edit may include automatically selected filter parameter values based on the techniques described herein, which may be subsequently approved or modified by the user.

In various implementations, one or more objects in a photo are detected, and classified. In some implementations, to classify the one or more objects, a type of object for each detected object may be recognized. A predetermined category may then be associated with each recognized object based on the type of object. In various implementations, a given predetermined category may describe the context in which an object type can be found. For example, the type of an object may be a tree, and a predetermined category for the object may be outdoors, landscaping, both outdoors and landscaping, etc.

In various implementations, one or more parameter values for one or more respective filters are selected based on the types and/or categories associated with one or more objects in an image. In various implementations, the terms photo and image may be used interchangeably. In some implementations, each filter may have multiple parameters. For example, a set of filters may include parameters for contrast, brightness, etc. In some implementations, one or more of the parameters may be adjusted to values based on the types and/or categories associated with one or more objects. For example, if a given photo has objects captured outdoors, a brightness parameter may be adjusted in one or more filters.

As described in more detail below, one or more of the filters selected by a user may be applied to the photo, with the one or more adjusted parameters.

Figure 1:
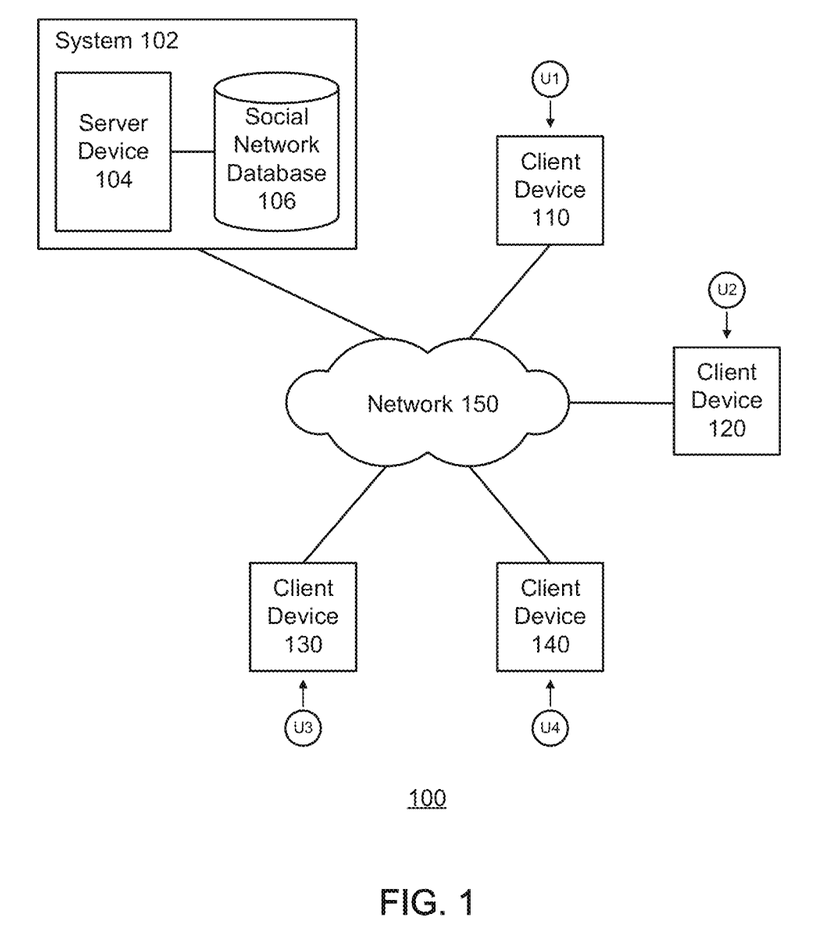
FIG. 1 illustrates a block diagram of an example network environment, according to some implementations.

FIG. 1 illustrates a block diagram of an example network environment 100, which may be used to implement the implementations described herein. In some implementations, network environment 100 includes a system 102, which includes a server device 104 and a social network database 106. Implementations may apply in contexts other than a social network. For example, implementations may apply independently from a social network or a social network database.

In various implementations, the term system 102 and phrase "social network system" may be used interchangeably. Network environment 100 also includes a network 150. Network environment 100 also includes client devices 110, 120, 130, and 140, which may communicate with each other directly, via network 150 and via system 102.

Implementations described herein may be carried out locally on a user device such as client devices 110-140, on a server such as server device 104, or a combination of both. For example, in some implementations, detection may be performed locally on a user client device, recognition may be performed by a server, one or more parameter settings may be performed on a user client device, etc. In various implementations, client devices 110-140 may include mobile devices (e.g., smart phone, camera etc.), wearable devices (e.g., watch, headset, augmented reality wearable device, etc.), wearable devices paired with computing devices, etc. Implementations described herein may operate on any suitable computing device and platform such as, for example, a software program running on a desktop or other type of device, a mobile application running on a mobile computing device (e.g., a smartphone, wearable device, etc.), a software program executing to provide the described functionalities over a web browser over the Internet, etc.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In some implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may upload photos to system 102 using respective client devices 110, 120, 130, and 140.

In the various implementations described herein, a processor of system 102 causes the elements described herein (e.g., photos, filter options, image parameter controls, etc.) to be displayed in a user interface on one or more display screens. In some implementations, a processor of client devices 110-140 may also display elements described herein. In various implementations, one or more display screens may be incorporated in client devices 110-140 to display the elements described herein.

In various implementations, system 102 may utilize object recognition techniques to recognize objects in photos. Example implementations of recognition techniques are described in more detail below.

While some implementations are described herein in the context of a social network system, these implementations may apply in contexts other than a social network. For example, implementations may apply for an individual user. For example, system 102 may perform the implementations described herein on a stand-alone computer, tablet computer, smartphone, etc. In some implementations, any of client devices 110-140 may also perform implementations described herein. In some implementations, a combination system 102 and any of devices 110-140 may perform implementations described herein.

Figure 2:
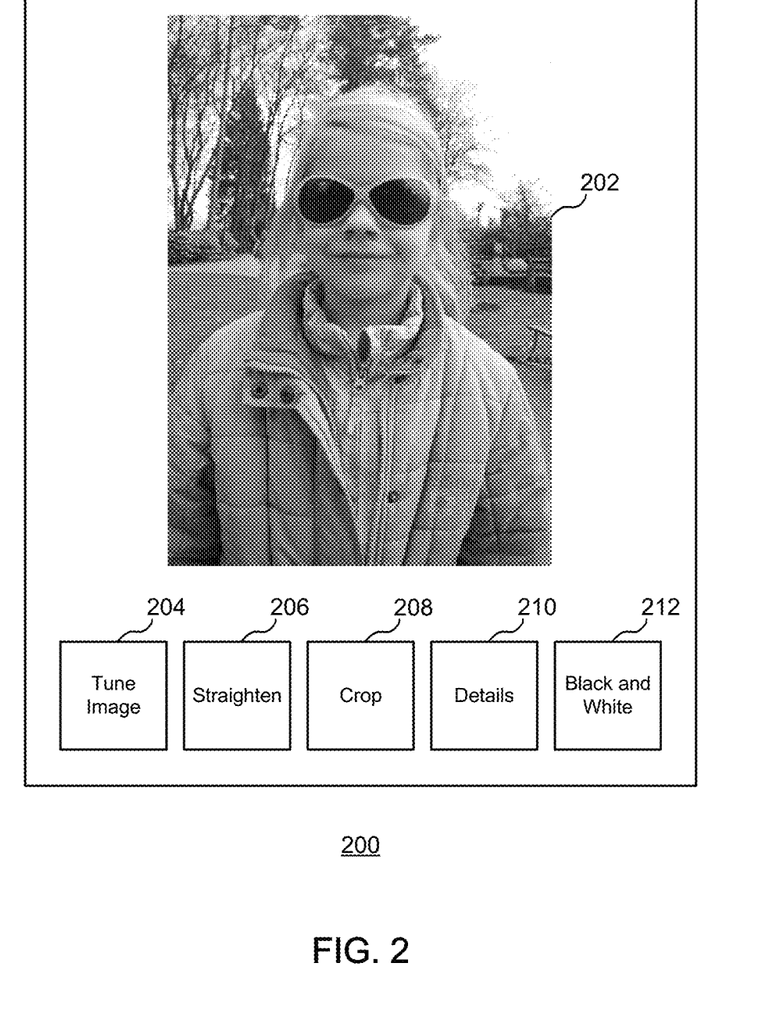
FIG. 2 illustrates an example user interface, according to some implementations.

FIG. 2 illustrates an example user interface 200, according to some implementations. User interface 200 may be implemented in association with various photo editing software. As shown, user interface 200 shows a photo 202 and various filter buttons. Each of the filter buttons when selected by a user activates a respective filter to adjust the image.

In various implementations, the filter buttons may include a tune image filter button 204 for a tune image filter, a straighten filter button 206 for a straighten filter, a crop filter button 208 for a crop filter, a details filter button 210 for a details filter, and a black and white filter button 212 for a black and white filter. Example implementations of these filters are described in more detail below. The actual number of filter buttons may vary depending on the particular implementation. Also, other filter buttons may be available and shown in user interface 200. In some implementations, other filter buttons may be shown via scrolling in user interface 200. For example, there may be filter buttons for respective automatic, selective adjust, drama, vintage, high-dynamic-range (HDR), grunge, center focus, tilt-shift, retrolux, and frames filters.

As described in more detail below, each filter has a set of parameters to adjust the behavior of the filter. In various implementations described herein, one or more filters (e.g., tune image filter, etc.) or any combination thereof may sharpen images, blur images, adjust brightness, adjust saturation, adjust contrast, etc. For example, the tune image filter may include parameters such as brightness, contrast, saturation, ambience, shadow, warmth, etc. In some implementations, if the user selects tune image filter button 204, parameters associated with the tune image filter are placed in a neutral setting and do not change the image. In some implementations, when the user selects tune image filter button 204, the shadow parameter is adjusted automatically (e.g., to increase the brightness of dark areas). In various implementations described herein, the terms parameters, filter parameters, and image parameters may be used interchangeably.

Figure 3:
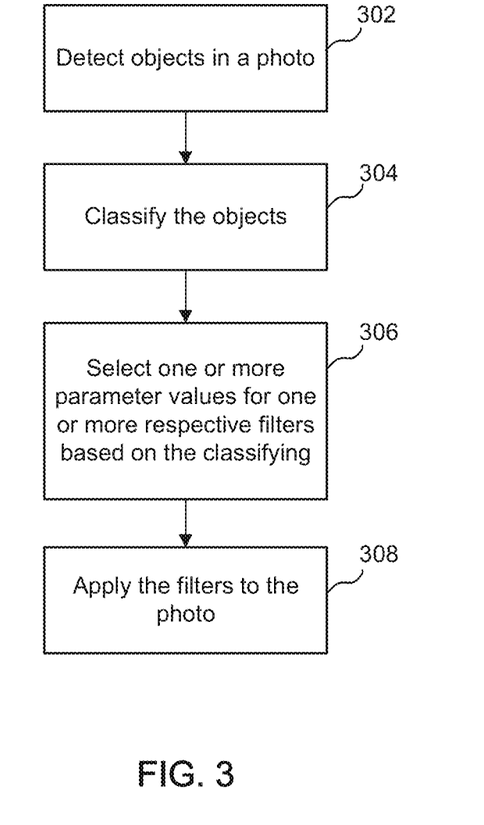
FIG. 3 illustrates an example flow diagram of a method for providing pre-edits for photos, according to some implementations.

FIG. 3 illustrates an example flow diagram of a method for providing pre-edits for photos, according to some implementations. As indicated herein, in various implementations, pre-edits are automatic adjustments to filter parameters that the system performs for the user. The method is initiated in block 302, where system 102 detects one or more objects (e.g., faces, trees, etc.) in a photo (e.g., photo 202). Such detection may be performed with the use of any suitable detection techniques to detect objects in the photo. In some implementations, detection of one or more objects may be performed by any one or more of client devices 110-140. In various implementations, the detection may be based on triggers such as when the user selects a filter to apply to the photo. In some implementations, the detection may begin based on other triggers (e.g., when the user opens one or more other applications, etc.). In some implementations, the detection may begin automatically upon reception of a photo (e.g., when a user uploads the photo to system 102, etc.).

In various implementations, system 102 may access photos from any variety of sources. For example, system 102 may receive photos from a user. In various implementations, the photos may be received when the user uploads the photos to system 102 or after the user adds the photos to one or more photo albums. In some implementations, system 102 may enable a camera device (e.g., camera device of a smart phone, tablet, etc.) of the user to automatically upload images to system 102 as the camera device captures photos. In some implementations, system 102 may receive a photo directly from an image sensor in a camera (e.g., before the photo is captured, but while it is shown as a "preview"). In some implementations, the method may also be locally triggered on client devices 110-140 based on a photo being captured by a device camera, or a photo being received from other devices or received from other sources (e.g., e-mail, website, photo-sharing service etc.), etc.

In block 304, system 102 classifies the one or more detected objects to determine one or more types for each object. For example, system 102 may classify objects in the photo into types such as people or faces, indoor objects, outdoor objects, etc. Faces may include, for example, human faces, non-human animal faces, depictions of faces, faces on inanimate objects, and the like. Indoor objects may include, for example, furniture, appliances, etc. Outdoor objects may include, for example, plants, trees, buildings, the horizon, the sun, etc.

In some implementations, to classify the one or more objects, system 102 recognizes at least one type of object for each detected object. For example, a given object may be recognized as both a face and an indoor object. Example implementations of recognition techniques used to recognize objects in photos are described in more detail below.

System 102 may then associate one or more predetermined categories to each object based on the type of object recognized. For example, predetermined categories may include categories such as people, faces, indoor objects, outdoor objects, etc. In some implementations, system 102 may associate multiple predetermined categories to each recognized object based on one or more object types recognized for a given object. For example, system 102 may associate multiple categories such as people, outdoor objects, etc. to a photo of a person standing outdoors. In some implementations, a category may have the same label as a type of object. For example, an object may be a face type of object and the category may be faces. In some implementations, a category may include multiple types of objects. For example, a face category may include different types of faces (e.g., human faces, non-human animal faces, depictions of faces, faces on inanimate objects, and the like). In some implementations, categories may be associated with types of objects using a look-up table.

In block 306, system 102 selects one or more parameter values for one or more respective filters based on the classifying of the one or more objects. As described in more detail below, in some implementations, when system 102 receives a user selection of a filter, system 102 automatically adjusts the parameters associated with the particular filter by changing predetermined values based on the classification of the particular image. Such parameters may be referred to as filter parameters or image parameters.

In some implementations, system 102 may enable the user to select one or more filters before opening a given photo. With the one or more filters already selected, when the user opens the given photo, system 102 may automatically select one or more parameter values for the user-selected filters and suggest the effects corresponding to the selected parameter values. This is beneficial in scenarios where the user wants to apply the same selected one or more filters to one or more photos. In other words, the user may want the same effects applied to a set of photos. For example, referring again to the user interface of FIG. 2, the user may select one or more of the filters before a given photo is opened. The selected filters may remain selected as the user opens each of multiple photos. In some implementations, all parameters for a particular filter may be pre-set such that the filter is not applied or recommended for that image. After system 102 receives one or more filter selections, system 102 may then detect one or more objects in the photo and classify the detected objects, as described herein. Based at least in part on the classification, system 102 may then select parameter values for the selected filter(s). As described in more detail below, system 102 may then apply the one or more user-selected filters to the photo with the selected parameter values to generate a filtered photo, and then provide the filtered photo to for display.

In various implementations, each filter includes multiple parameters. As described in more detail below, in various implementations, system 102 adjusts one or more of the parameter values based on the classifying of the one or more objects.

In block 308, system 102 applies one or more of the filters to the photo. In various implementations, system 102 applies one or more of the filters selected by the user to the photo. As indicated above, system 102 automatically adjusts the parameter values associated with the particular filter to predetermined values based on the classification(s) of the particular photo. When system 102 applies one or more filters, system 102 produces an image that the user generally need not have to adjust further. Because of the detection of one or more objects, the classification of the one or more objects, and the corresponding parameter selection, the automatically applied parameter values may be the most suitable parameter values for the image. As such, the parameters values produce an image that a user may find satisfactory. In some examples, users may further modify the image (e.g., change the some of the parameter values). In some implementations, copies of photos with such pre-edits applied may saved and stored on a server and displayed for viewing.

In some implementations, system 102 may determine a set of parameter values for the entire image based on the types of objects in the photo/image, the number of each type of object in the image, the proportion of the image taken up by each type of object, etc. In some implementations, system 102 may determine parameter values on an object-by-object basis based on the type of the object. Similarly, in some implementations, the system 102 may determine a set of filters to be applied or to recommend based on the types of objects in the image, the number of each type of object, the proportion of the image taken up by each type of object, etc. In some implementations, system 102 may determine a set of filters to be applied or to recommend based on the types of objects. In some implementations, system 102 may determine filters to apply or to recommend and parameter values to pre-set or recommend for those filters.

In various implementations, system 102 may apply different filters to different portions (e.g., different objects) of a given photo based on how each object is classified. In some implementations, the same filters may be applied with different parameter values. For example, a filter "Tune Image" may have different parameter values for indoor objects than for outdoor objects. In some implementations, the same filter with different parameter values may be applied to different objects of the same photo. In some implementations, different filters may be applied to different objects of the same photo. In some implementations, multiple filters for an individual object, each with its own parameter values, may be applied to different objects of the same photo.

In some implementations, system 102 may apply the same filter to different objects within a given photo, yet with different parameter values based on how each object is classified.

In various implementations, while system 102 automatically adjusts parameter values based on the classification of objects in an image, system 102 also enables the user to manually adjust one or more different parameter values for one or more filters. In some implementations, system 102 may enable the user to manually adjust one or more parameter values. System 102 may also cause both an initial adjustment (based on object classification) and the user-adjusted image to be displayed. Such presentation may assist the user in understanding the change in the image as a result of application of the filter.

In various implementations, after applying one or more filters, system 102 may cause a preview of the filtered photo to be displayed in a user interface for the user for approval or further adjustments. In various implementations, system 102 may also cause the user interface to display the parameter values, where the user interface is effective to receive user input to adjust one or more of the parameter values. System 102 may also store the filter photo in any suitable storage location (e.g., at system 102, at a client device of the user, etc.).

Figure 4:
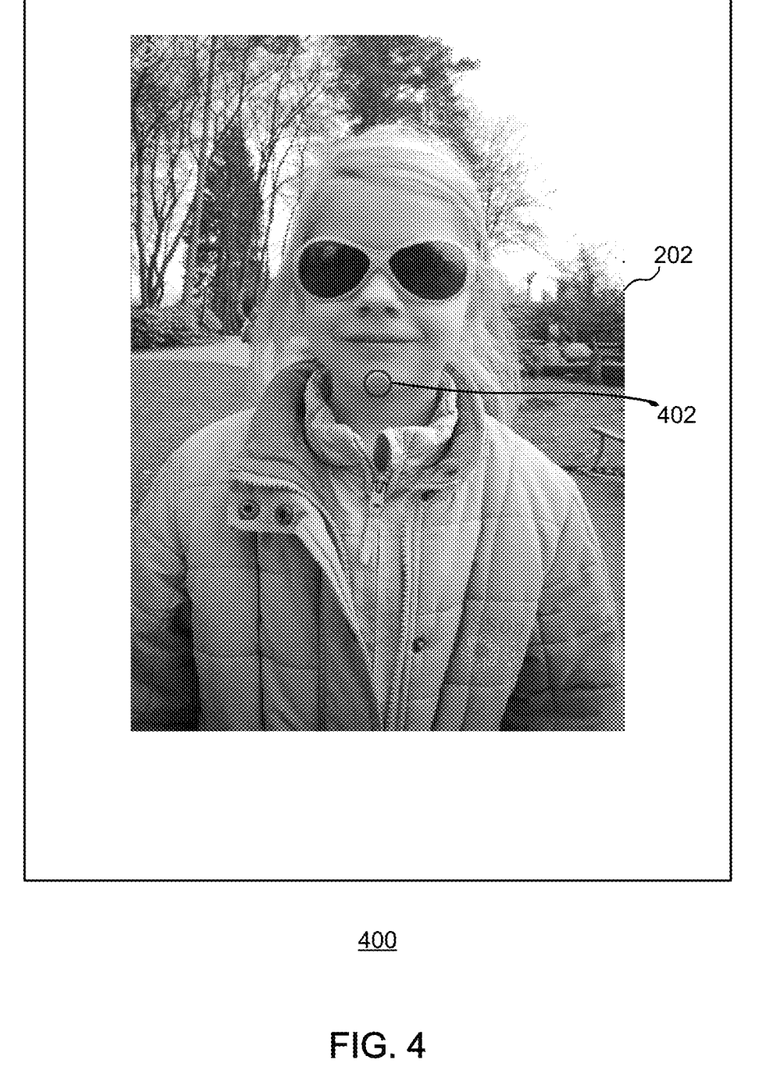
FIG. 4 illustrates an example user interface, according to some implementations.

FIG. 4 illustrates an example user interface 400, according to some implementations. In various implementations, the center point of a given object (e.g., a face) may be placed in the center of the image (e.g., the center of photo 202). In the example shown, the image of the face of the girl is not centered. Instead, the chin 402 of the girl is at the center of photo 202.

Figure 5:
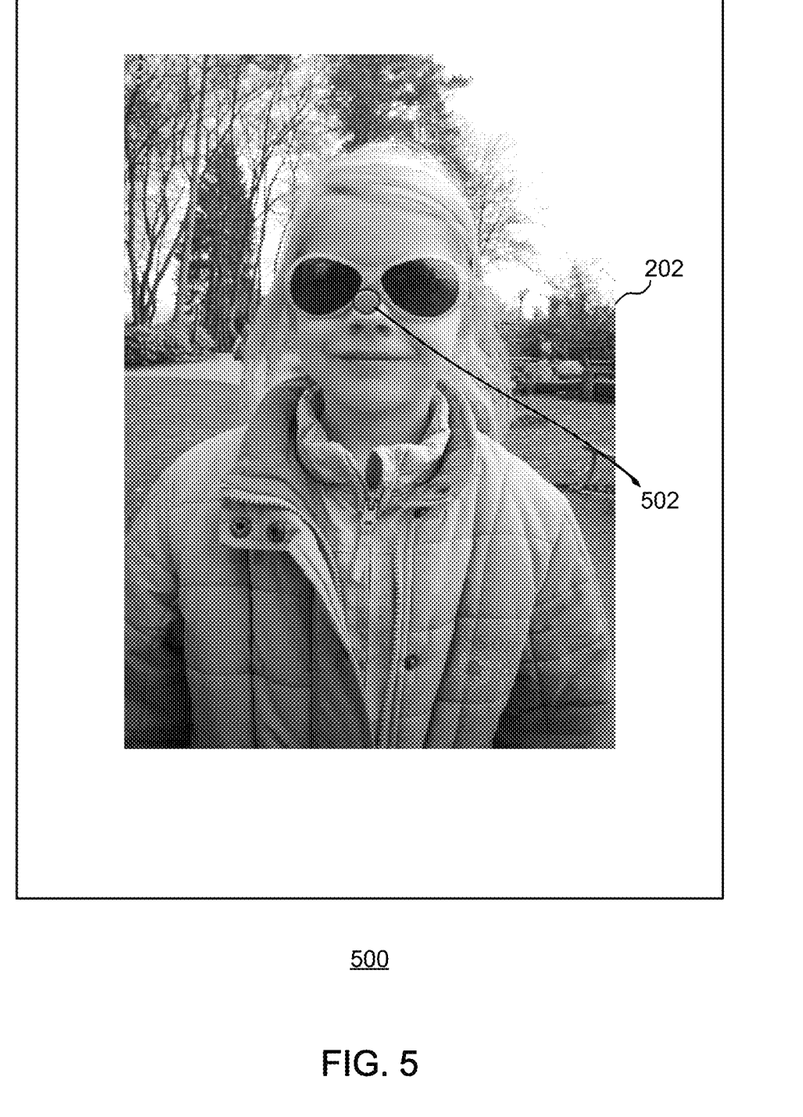
FIG. 5 illustrates an example user interface, according to some implementations.

FIG. 5 illustrates an example user interface 400, according to some implementations. In some implementations, system 102 provides a center focus filter, where system 102 may use face detection and/or face recognition to select the center point at a suitable position.

In some implementations, the center focus filter performs operations including determining a center point of an object based on recognition data. In the example of FIG. 5, the center focus filter of system 102 recognizes an object such as the face, and based on the boundaries of the object, determines the center point (e.g., the nose of the face).

In some implementations, the center point may be determined to be the physical center of an object in the image (e.g., the nose of the face). In some implementations, the center point may be determined to be a focal point of the image, other than the physical center. For example, in some implementations, the center point may be to one side or near the top or bottom of the image, based on the position of different objects in the image. In some implementations, system 102 may enable the user to select the center point.

In various implementations, system 102 uses the center point to align with the center of the image or photo. For example, referring to FIG. 4, chin 402 of the face is positioned at the center of the image (e.g., halfway down and halfway across the image). Based on recognition data, it may be determined that a different position of the face (e.g. bridge of the nose 502) is suitable as the center point. As such, the center of photo 202 is adjusted such that the bridge of the nose 502 is positioned at the center of the image. As a result, the image is horizontally and vertically centered at the bridge of nose 502.

The center focus filter of system 102 then adjusts one or more parameter values for one or more respective filters based on the center point. For example, some of the image parameters associated with the center focus filter may include coordinate values, and system 102 may adjust the coordinate values in order to reposition the center point. Such coordinate values may include, for example, facial coordinates of various elements of a face (e.g., eyes, ears, nose, mouth, etc.). In some implementations, the one or more parameters may also include the size of a radial region, a blur, an inner brightness, an outer brightness, etc. In various implementations, system 102 enables the user to manually drag the center point (indicated with a dot) to a desired location, for example to a more horizontally or vertically centered position or at any appropriate location in the photo.

In some implementations, the center focus filter automatically determines the center of effect, a size of a radial region, a blur, an inner brightness, an outer brightness, etc. In some implementations, the default value of the center focus filter may increase the inner brightness of the radial region and decrease the outer brightness. In some implementations, system 102 may suggest a crop based on the adjusted center region.

In some implementations, a filter may perform operations including determining the color of a face based on recognition data, and adjusting one or more parameter values associated a filter that adjusts the exposure of the face, where the adjusting of the one or more parameter values is based on at least the color of the face. For example, the filter may determine the color of the face using facial recognition to identify the same face in multiple photos. In some implementations, the filter may determine the color of the face from an aggregate of photos containing the same face. In various implementations, the filter may identify an underexposed face and then adjust the exposure of the face based on the color of the face.

In some implementations, a filter may perform operations including identifying at least one outdoor object based on recognition data and/or any other data. For example, system 102 may recognize a given object as an outdoor object using any appropriate recognition techniques such as those described herein. System 102 may also identify a given object as an outdoor object based on stored image data or metadata. For example, metadata may indicate that a given photo contains a tree, a sunrise, etc.

The filter may then adjust at least one parameter value associated with a filter that adjusts parameter values associated with outdoor objects based on one or more predetermined criteria. For example, in some implementations, the filter may apply high-dynamic-range landscaping (HDR Scape) and associated predetermined filter/image parameters (e.g., filter strength set to 60, 75, etc.) to the photo.

In some implementations, system 102 may use camera metadata to determine an aperture value and lens type, and then to increase/decrease the depth of field based on the aperture value and lens type. System 102 may also apply a blur technique (e.g., of a center focus filter) or a sharpen technique (e.g., of a details filter) to the photo background. In various implementations, system 102 may selectively apply one or more filters to objects classified as "foreground" objects and objects classified as "background" objects.

In some implementations, a predetermined criterion may involve brightness of an object in a given photo. For example, the predetermined criterion may be that various portions and/or objects of a given photo are sufficiently bright to be visible. In some implementations, system 102 may classify one or more objects as "shadowed" or "receiving less light." Based on the classification, system 102 may apply a filter to adjust the brightness for each of such objects. As such, in some implementations, system 102 may increase the light/brightness in shadowed areas of a photo in order to render objects in shadowed areas to be more visible.

In some implementations, a predetermined criterion may involve orientation of an object in a given photo. For example, the predetermined criterion may be that a given object needs to have a level orientation. As such, in some implementations, for objects determined to be in outdoor settings, system 102 may also recognize the horizon and may adjust the orientation of the photo in order to level or straighten the horizon along a horizontal axis.

In some implementations, at least one filter performs operations including identifying one or more foreground objects and background objects based on recognition data, and adjusting one or more parameter values associated with a filter that adjusts parameter values associated with foreground and background objects based on each of one or more predetermined criteria.

In some implementations, one or more filters may take into account different settings depending on the types of objects, or classification of object in a photo. For example, one or more filters may adjust parameter values of person's face in a portrait photo differently from trees or other outdoor objects in a landscape photo.

In some implementations, at least one filter performs operations including converting a color photo to a black and white photo. When converting an image to black and white, the skin colors can look unnatural. In various implementations, to make the skin colors of the image look more natural, black and white filters may apply a color filter that changes the technique to calculate the luminance value for a given color. By adjusting the color filter, system 102 places more emphasis on red, green or blue colors in skin, sky, foliage, etc. In some implementations, when system 102 detects persons in the image, system 102 may adjust parameters values of the color filter to preserve a natural coloring of the skin.

In some implementations, system 102 masks portions of the image and may selectively apply one or more filters to one or more objects in the image. This is made possible by recognizing the individual objects and then adjusting parameter values of particular filters based on classifications of the objects.

Implementations described herein may provide various benefits. For example, implementations described herein provide a variety of filters with parameter values that the system automatically adjusts based on the particular content of a given photo. This provides desirable photo effects particular to the content to a give photo. It may also provide an example to a user of how a given photo may be further enhanced with provided filters.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 and/or client devices 110-140 may perform the steps described.

In various implementations, system 102 may utilize a variety of recognition techniques to recognize objects, landmarks, etc. in images. Such recognition techniques may be integral to system 102. System 102 may also access recognition techniques provided by software that is external to system 102 and which system 102 accesses.

In various implementations, system 102 obtains reference images of objects, where each reference image includes an image of an object that is associated with a known object or category of object. The object is known, in that system 102 has the user's identity information such as the object's name and other object information. In some implementations, a reference image may be, for example, an object image that users have uploaded. In some implementations, a reference image may be based on a composite of a group of reference images.

In some implementations, to recognize an object, system 102 may compare the object (e.g., image of the object) and match the object to reference images of the object. Note that the term "object" and the phrase "image of the object" are used interchangeably. For ease of illustration, the recognition of one object is described in some of the example implementations described herein. These implementations may also apply to each object of multiple objects to be recognized.

In some implementations, system 102 may search reference images in order to identify one or more reference images that are similar to the object in the image (e.g., a photo). In some implementations, for a given reference image, system 102 may extract features from the image of the object in an image for analysis, and then compare those features to those of one or more reference images. For example, system 102 may analyze the relative position, size, and/or shape of object features such as facial characteristics, body characteristics, etc. In some implementations, system 102 may use data gathered from the analysis to match the object in the image to one more reference images with matching or similar features. In some implementations, system 102 may normalize multiple reference images, and compress object data from those images into a composite representation having information (e.g., object feature data), and then compare the object in the image to the composite representation for facial recognition.

In some scenarios, the object in the image may be similar to multiple reference images associated with the objects in the same category. As such, this may indicate that the object in the image is the same object associated with the reference images.

In some implementations, to facilitate in object recognition, system 102 may use geometric recognition techniques, which are based on feature discrimination. System 102 may also use photometric techniques, which are based on a statistical approach that distills an object feature into values for comparison. A combination of the geometric and photometric approaches could also be used when comparing the object in the image to one or more references. In some implementations, system 102 may perform object recognition techniques using one or more of a geometric recognition technique, a photometric technique, or any other suitable recognition techniques hidden Markov model (HMM), principal component analysis (PCA), linear discriminant analysis (LDA), etc.

Other recognition techniques may be used. For example, system 102 may use recognition techniques that use one or more of principal component analysis, linear discriminate analysis, elastic bunch graph matching, hidden Markov models, and dynamic link matching. It will be appreciated that system 102 may use other known or later developed recognition techniques, and/or systems.

In some implementations, system 102 may generate an output indicating a likelihood (or probability) that the object in the image matches a given reference image. In some implementations, the output may be represented as a metric (or numerical value) such as a percentage associated with the confidence that the object in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a recognition technique. Various recognition techniques and/or visual search systems may be used to recognize objects such as landmarks, logos, entities, events, faces, etc. in order to implement implementations described herein.

Figure 6:
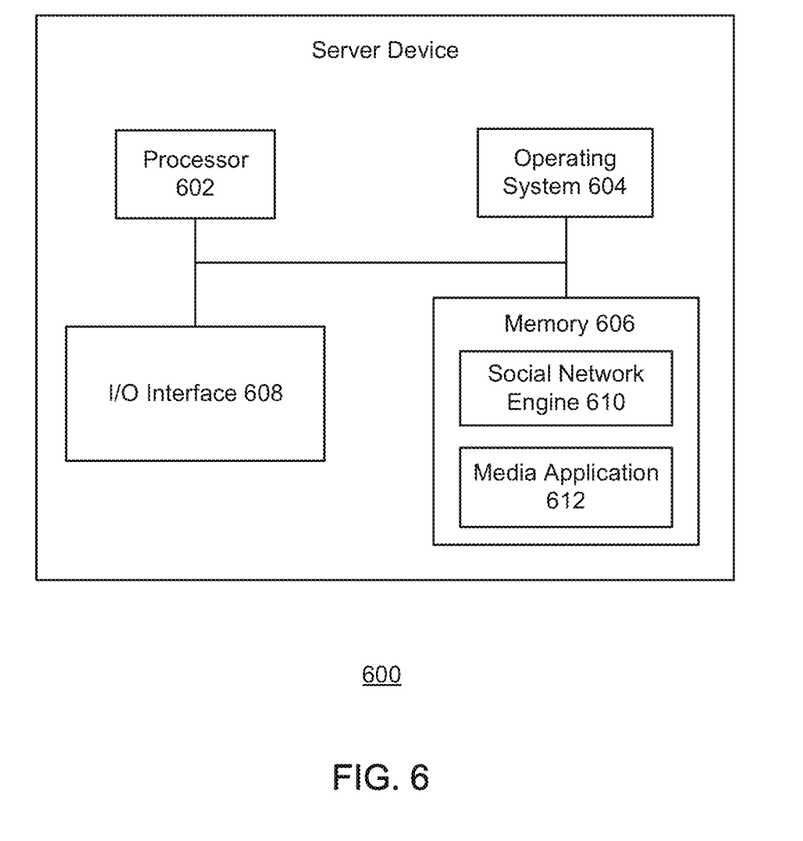
FIG. 6 illustrates a block diagram of an example computing device, according to some implementations.

FIG. 6 illustrates a block diagram of an example computing device 600, which may be used to implement the implementations described herein. For example, computing device 600 may be used to implement server device 104 of FIG. 1, as well as to perform the method implementations described herein. Implementations described herein may be carried out locally on a user device, on a server, or a combination of both. In some implementations, computing device 600 includes a processor 602, an operating system 604, a memory 606, and an input/output (I/O) interface 608. Server device 600 also includes an optional social network engine 610 (or any suitable engine) and a media application 612, which may be stored in memory 606 or on any other suitable storage location or non-transitory computer-readable medium. Media application 612 provides instructions that enable processor 602 to perform the functions described herein and other functions.

For ease of illustration, FIG. 6 shows one block for each of processor 602, operating system 604, memory 606, I/O interface 608, social network engine 610, and media application 612. These blocks 602, 604, 606, 608, 610, and 612 may represent multiple processors, operating systems, memories, I/O interfaces, social network engines, and media applications. In other implementations, computing device 600 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A computer-implemented method for providing image edits, the method comprising:
    causing a display of a user interface including a plurality of filter controls;
    receiving a selection of one or more filter controls of the plurality of filter controls based on first user input received via the user interface;
    in response to the selection of the one or more filter controls, activating one or more selected image-modifying filters associated with the one or more filter controls;
    obtaining a digital image;
    detecting, by a hardware processor, one or more image objects in the digital image;
    classifying, by the hardware processor, the one or more image objects, wherein the classifying comprises:
        determining at least one object type for each of the one or more detected image objects, wherein each of the at least one object type is selected from a set of a plurality of predetermined image object types;
    selecting, by the hardware processor, one or more parameter values for the one or more selected image-modifying filters based on the at least one object type determined for the one or more detected image objects, wherein the selecting the one or more parameter values is based on a proportion of the digital image covered by each respective object type detected in the digital image; and
    applying, by the hardware processor, the one or more selected image-modifying filters to the digital image with the one or more selected parameter values to modify pixel values of the digital image to change a display appearance of one or more areas of the digital image associated with at least one of the one or more image objects and generate a modified digital image.

2. The method of claim 1, wherein the classifying further comprises:
    associating one or more predetermined categories to each respective detected object based on the at least one object type determined for the one or more respective detected objects, wherein the one or more associated predetermined categories are selected from a plurality of predetermined categories that include a category of people and a category of faces, and wherein the one or more parameter values are selected based on the one or more associated predetermined categories.

3. The method of claim 1, further comprising, prior to applying the one or more selected image-modifying filters, causing a display of the one or more selected parameter values and a display of a recommendation, wherein the recommendation suggests that the one or more selected parameter values be used with the one or more image-modifying filters, wherein the recommendation is based on the at least one type of object determined in the image.

4. The method of claim 1, wherein the one or more selected image-modifying filters comprise one or more of a tune image filter, a straighten filter, a crop filter, a details filter, and a black and white filter.

5. The method of claim 1, wherein selecting one or more parameter values includes:
    determining a center point of a selected one of the one or more image objects based on recognition data associated with the selected image object and indicative of one or more characteristics of the selected image object; and
    adjusting at least one of the one or more parameter values for the one or more selected image-modifying filters based on the center point.

6. The method of claim 1, wherein at least one of the one or more detected image objects is a face, and wherein at least one of the one or more selected image-modifying filters performs operations comprising:
    adjusting an exposure of the face based on at least one of the one or more parameter values, wherein the adjusting of the exposure of the face is based on at least a color of the face.

7. The method of claim 1, wherein at least one of the one or more detected image objects is an outdoor image object associated with an object type that is outdoor objects, wherein at least one of the one or more selected image-modifying filters performs operations comprising:
    adjusting values of the image associated with the at least one detected outdoor image object based on one or more of brightness and orientation of the at least one detected outdoor image object.

8. The method of claim 1, wherein selecting one or more parameter values for the one or more selected image-modifying filters is based on a number of the one or more detected objects of each object type in the digital image.

9. The method of claim 1, wherein each of the at least one object type is selected from a set of predetermined image object types including indoor, outdoor, and face.

10. The method of claim 1, wherein obtaining the digital image is performed after receiving the selection of the one or more filter controls, wherein the one or more selected image-modifying filters are assigned to the digital image.

11. A non-transitory computer-readable storage medium carrying program instructions thereon, the instructions when executed by one or more processors cause the one or more processors to perform operations comprising:
- receiving a selection of one or more image-modifying filters based on first user input received via a displayed user interface;
- in response to receiving the selection of the one or more image-modifying filters, detecting one or more image objects in a digital image;
- classifying the one or more image objects, wherein the classifying comprises:
  - determining at least one object type for each of the one or more detected image objects, wherein each of the at least one object type is selected from a set of a plurality of predetermined types of image objects;
- selecting one or more parameter values for the one or more selected image-modifying filters based on the at least one object type determined for the one or more detected image objects and based on a proportion of the digital image covered by each respective object type detected in the digital image; and
- causing a display of the one or more selected parameter values and a display of a recommendation indicating that the one or more selected parameter values be used with the one or more selected image-modifying filters;
- receiving an approval of the recommendation based on received second user input; and
- after receiving the approval, applying the one or more selected image-modifying filters to the digital image with the one or more selected parameter values to modify pixel values of the digital image to change a display appearance of one or more areas of the digital image that are associated with at least one of the one or more image objects.

12. The computer-readable storage medium of claim 11, wherein the instructions further cause the one or more processors to perform operations comprising:
- obtaining the digital image after receiving the selection of the one or more image-modifying filters, wherein the one or more image-modifying filters are assigned to the digital image.

13. The computer-readable storage medium of claim 11, wherein the instructions further cause the one or more processors to perform operations comprising associating one or more predetermined categories to each detected image object based on the at least one object type, wherein the one or more predetermined categories include a category of people and a category of faces, and wherein the one or more parameter values are selected based on the one or more associated predetermined categories.

14. The computer-readable storage medium of claim 11, wherein selecting one or more parameter values for the one or more respective image-modifying filters is additionally based on:
- a number of the one or more detected objects of each object type in the digital image.

15. The computer-readable storage medium of claim 11, wherein the instructions further cause the one or more processors to perform operations comprising:
- determining a center point of a selected one of the image objects based on recognition data associated with the selected image object, the recognition data indicative of one or more characteristics of the selected image object; and
- adjusting the one or more parameter values for the one or more selected image-modifying filters based on the center point.

16. The computer-readable storage medium of claim 11, wherein at least one of the one or more detected image objects is a face, wherein the instructions further cause the one or more processors to perform operations comprising:
- adjusting an exposure of the face based on at least one of the one or more parameter values, wherein the adjusting of the exposure of the face is based on at least a color of the face.

17. The computer-readable storage medium of claim 11, wherein at least one of the one or more detected image objects is an outdoor image object associated with an object type that is outdoor objects, wherein the instructions further cause the one or more processors to perform operations comprising:
- adjusting values of the image associated with the at least one detected outdoor image object based on one or more of brightness and orientation of the at least one detected outdoor image object.

18. A system comprising:
- one or more processors; and
- logic encoded in one or more tangible media for execution by the one or more processors and when executed operable to perform operations comprising:
  - causing a display of a digital image;
  - receiving a selection of one or more selected image-modifying filters based on first user input received via a displayed user interface;
  - in response to receiving the selection of the one or more selected image-modifying filters, detecting one or more image objects in the digital image;
  - classifying the one or more image objects, wherein the classifying comprises:
    - determining at least one object type for each of the one or more detected image objects, wherein each of the at least one object type is selected from a set of a plurality of predetermined types of image objects;
  - selecting one or more parameter values for one or more respective image-modifying filters based on the at least one object type determined for the one or more detected image objects, wherein selecting one or more parameter values is based on a proportion of the digital image covered by each respective object type detected in the digital image; and
  - applying the one or more image-modifying filters to the digital image with the one or more selected parameter values to modify pixel values of the digital image to change a display appearance of one or more areas of the image associated with at least one of the one or more image objects.

19. The system of claim 18, wherein the logic when executed is further operable to perform operations comprising:
- obtaining the digital image after receiving the selection of the one or more image-modifying filters, wherein the one or more selected image-modifying filters are assigned to the digital image.

20. The system of claim 18, wherein the set of predetermined types of image objects includes an object type that is indoor objects and an object type that is outdoor objects, and wherein the logic when executed is further operable to perform operations comprising associating one or more predetermined categories to each detected image object based on the at least one object type, wherein the one or more predetermined categories include a category of people and a category of faces, and wherein the one or more parameter values are selected based on the one or more associated predetermined categories.

\* \* \* \* \*